(12) United States Patent
Lomp et al.

(10) Patent No.: US 8,976,837 B1
(45) Date of Patent: Mar. 10, 2015

(54) LOW PROBABILITY OF DETECTION (LPD) WAVEFORM

(75) Inventors: Gary R. Lomp, Centerport, NY (US); John F. Courtien, Bay Shore, NY (US); David A. Haessig, Jr., Towaco, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 224 days.

(21) Appl. No.: 13/569,330

(22) Filed: Aug. 8, 2012

Related U.S. Application Data

(60) Provisional application No. 61/574,856, filed on Aug. 9, 2011.

(51) Int. Cl.
H04B 1/00 (2006.01)

(52) U.S. Cl.
USPC ........... 375/135; 375/132; 375/130; 375/260; 375/259; 375/316; 375/295

(58) Field of Classification Search
USPC .......... 375/135, 132, 130, 260, 259, 316, 295
See application file for complete search history.

(56) References Cited

U.S. PATENT DOCUMENTS

| | | | | |
|---|---|---|---|---|
| 2003/0012174 A1* | 1/2003 | Bender et al. | ................. | 370/347 |
| 2003/0156603 A1* | 8/2003 | Rakib et al. | ................... | 370/485 |
| 2010/0080310 A1* | 4/2010 | Moffatt et al. | ................ | 375/260 |

* cited by examiner

Primary Examiner — Zewdu Kassa
(74) Attorney, Agent, or Firm — Sand & Sebolt; Daniel J. Long

(57) ABSTRACT

A system and method for generating a low probability of detection (LPD) waveform is presented. The method modulates pre-modulated symbols using pulse-position modulation (PPM) to produce PPM modulated signals with a modulated in-phase (I) component and a modulated quadrature (Q) component. Next, frequency hopping is used to transmit the modulated I component at a randomized start time within a time slot and to transmit the modulated Q component at the randomized start time within the same slot. The modulated Q component does not overlap with the modulated I component. The method can also overlay transmission security (TRANSEC) pseudorandom (PN) overlay on the modulated Q component and the modulated I component before the modulated Q component and the modulated I component are transmitted.

20 Claims, 13 Drawing Sheets

| Preset | Burst Rate (kb/s) | User Rate (kb/s) | Range Ratio (C/I) | | |
|---|---|---|---|---|---|
| | | | Hata | $R^4$ | $R^2$ |
| 1 | 8.8 | 5.3 | 6.7 | 7.8 | 60.5 |
| 2 | 16.0 | 10.5 | 5.8 | 6.7 | 44.3 |
| 3 | 21.6 | 14.9 | 5.4 | 6.1 | 37.0 |
| 4 | 38.4 | 26.9 | 4.7 | 5.2 | 27.1 |
| 5 | 56.0 | 39.7 | 4.2 | 4.7 | 22.0 |
| 6 | 56.0 | 39.7 | 4.2 | 4.7 | 22.0 |
| 7 | 86.4 | 61.6 | 3.8 | 4.1 | 17.2 |
| 8 | 86.4 | 61.6 | 3.8 | 4.1 | 17.2 |
| 9 | 132.0 | 94.4 | 3.4 | 3.7 | 13.4 |
| 10 | 132.0 | 94.4 | 3.4 | 3.7 | 13.4 |
| 11 | 195.2 | 139.7 | 3.0 | 3.2 | 10.5 |
| 12 | 195.2 | 139.7 | 3.0 | 3.2 | 10.5 |

| Pre-set | Symbol | | Active Region | | Guard Time (μs) | Burst Rate (kb/s) | Ratio (C/I) | | | Over-head (kb/s) | Usable Rate (kb/s) | Code Rate | User Rate (kb/s) | Voice Service | | | pt-to-pt thruput (kb/s) | est. net thruput (kb/s) | max packet (bytes) |
|---|---|---|---|---|---|---|---|---|---|---|---|---|---|---|---|---|---|---|---|
| | Bits | Chips | Length (μs) | No. per slot | | | Hata | $R^4$ | $R^2$ | | | | | 1st | 2nd | relay | | | |
| 1 | 11 | 143 | 2048 | 1 | 310 | 8.8 | 6.7 | 7.8 | 60.5 | 1.8 | 7.0 | 0.75 | 5.250 | | | | 4.3 | 8.0 | 576 |
| 2 | 10 | 91 | 1024 | 2 | 272 | 16.0 | 5.8 | 6.7 | 44.3 | 2.0 | 14.0 | 0.75 | 10.500 | ✓ | | | 0.8 | 1.5 | 576 |
| 3 | 9 | 143 | 512 | 3 | 538 | 21.6 | 5.4 | 6.1 | 37.0 | 1.8 | 19.8 | 0.75 | 14.850 | ✓ | | | 4.8 | 9.5 | 576 |
| 4 | 8 | 91 | 256 | 6 | 424 | 38.4 | 4.7 | 5.2 | 27.1 | 2.5 | 35.9 | 0.75 | 26.925 | ✓ | ✓ | ✓ | 7.5 | 1.4 | 576 |
| 5 | 7 | 91 | 128 | 10 | 320 | 56.0 | 4.2 | 4.7 | 22.0 | 3.1 | 52.9 | 0.75 | 39.675 | ✓ | | ✓ | 3.7 | 7.0 | 1500 |
| 6 | 7 | 91 | 128 | 10 | 320 | 56.0 | 4.2 | 4.7 | 22.0 | 3.1 | 52.9 | 0.75 | 39.675 | ✓ | ✓ | ✓ | 18.0 | 30.0 | 1500 |
| 7 | 6 | 55 | 64 | 18 | 376 | 86.4 | 3.8 | 4.1 | 17.2 | 4.3 | 82.1 | 0.75 | 61.575 | ✓ | | ✓ | 25.0 | 45.0 | 1500 |
| 8 | 6 | 55 | 64 | 18 | 376 | 86.4 | 3.8 | 4.1 | 17.2 | 4.3 | 82.1 | 0.75 | 61.575 | ✓ | ✓ | ✓ | 40.0 | 75.0 | 1500 |
| 9 | 5 | 35 | 32 | 33 | 322 | 132.0 | 3.4 | 3.7 | 13.4 | 6.2 | 125.8 | 0.75 | 94.350 | ✓ | | ✓ | 50.0 | 100.0 | 1500 |
| 10 | 5 | 35 | 32 | 33 | 322 | 132.0 | 3.4 | 3.7 | 13.4 | 6.2 | 125.8 | 0.75 | 94.350 | ✓ | ✓ | ✓ | 65.0 | 130.0 | 1500 |
| 11 | 4 | 21 | 16 | 61 | 304 | 195.2 | 3.0 | 3.2 | 10.5 | 8.9 | 186.3 | 0.75 | 139.725 | ✓ | ✓ | ✓ | 78.0 | 150.0 | 1500 |
| 12 | 4 | 21 | 16 | 61 | 304 | 195.2 | 3.0 | 3.2 | 10.5 | 8.9 | 186.3 | 0.75 | 139.725 | ✓ | ✓ | ✓ | 96.0 | 190.0 | 1500 |

FIG-8

| Preset | PLI | Low Rate Data | Voice | Medium Rate Data | Voice Relay | Multi-Channel Voice |
|---|---|---|---|---|---|---|
| 1 | X | | | | | |
| 2 | R | | R | | | |
| 3 | | X | | | | |
| 4 | | | X | | | |
| 5 | X | X | | | | |
| 6 | X | X | X | | | |
| 7 | X | | X | X | | |
| 8 | X | | | X | X | |
| 9 | X | | X | X | X | X |
| 10 | | | | | | |
| 11 | | | | | | |
| 12 | | | | | | |

FIG-9

| Preset | Symbol Size (Chips) | User Data Rate (kb/s) | TDMA Duty Cycle (%) | TDMA Duty Cycle (dB) | Required SNR at SRW Rcvr at 1% PER | M-ary Pulse Processing Gain (dB) | Interceptor path-loss advantage (dB) | Range Ratio (C/I) for 175 MHz of spectrum | | | Range Ratio (C/I) for 30 MHz of spectrum | | |
|---|---|---|---|---|---|---|---|---|---|---|---|---|---|
| | | | | | | | | Hata | $R^4$ | $R^2$ | Hata | $R^4$ | $R^2$ |
| 1 | 143 | 5.2 | 5.7 | 12.4 | 11.8 | 21.6 | 28.0 | 6.8 | 7.8 | 60.5 | 4.4 | 5.0 | 25.1 |
| 2 | 91 | 10.5 | 7.3 | 11.4 | 11.5 | 19.6 | 25.3 | 5.8 | 6.7 | 44.3 | 3.8 | 4.3 | 18.3 |
| 3 | 143 | 14.8 | 17.2 | 7.7 | 11.3 | 21.6 | 23.7 | 5.4 | 6.1 | 37.0 | 3.5 | 3.9 | 15.3 |
| 4 | 91 | 26.9 | 21.8 | 6.6 | 11.0 | 19.6 | 21.0 | 4.7 | 5.2 | 27.1 | 3.0 | 3.3 | 11.2 |
| 5,6 | 91 | 39.7 | 36.4 | 4.4 | 10.6 | 19.6 | 19.2 | 4.2 | 4.7 | 22.0 | 2.8 | 3.0 | 9.1 |
| 7,8 | 91 | 61.6 | 39.6 | 4.0 | 10.2 | 17.4 | 17.0 | 3.8 | 4.1 | 17.2 | 2.5 | 2.7 | 7.1 |
| 9,10 | 55 | 94.3 | 46.2 | 3.4 | 9.7 | 15.4 | 14.9 | 3.4 | 3.7 | 13.4 | 2.2 | 2.4 | 5.6 |
| 11,12 | 35 | 139.7 | 51.2 | 2.9 | 9.2 | 13.2 | 12.7 | 3.0 | 3.2 | 10.5 | 2.0 | 2.1 | 4.3 |
| | 21 | | | | | | | | | | | | |

FIG-14

LOW PROBABILITY OF DETECTION (LPD) WAVEFORM

CROSS REFERENCE TO RELATED APPLICATION

This application claims priority from U.S. Provisional Patent Application Ser. No. 61/574,856, filed Aug. 9, 2011; the disclosure of which is incorporated herein by reference.

BACKGROUND OF THE INVENTION

1. Field of Invention

The current invention relates generally to apparatus, systems and methods for transmitting wireless signals. More particularly, the apparatus, systems and methods relate to transmitting wireless information using pulse-position modulation with independently coded and delayed in phase and quadrature components. Specifically, the apparatus, systems and methods provide for transmitting wireless data that is adaptable in response to user needs and propagations conditions in addition to having a low probability of detection (LPD).

2. Description of Related Art

Many prior art LPD systems depend on frequency hopping and direct sequence spreading to achieve LPD on relatively narrowband channels (typically 30 MHz or less). Typically, phase modulation is applied to these signals to modulate data on the carriers. Pulse-position modulation (PPM) is also a well-known technique for modulating data. When combined with relatively short pulses, combining these techniques provide a very high degree of low probability of interference (LPI) while affording the use of easily implementable very short correlators for pulse detection. Other modulation approaches that modulate using direct sequence with frequency hopping typically require much longer correlators requiring higher receiver complexity. A need therefore exists for improved methods and apparatus for communication with a low probability of detection by unintended receivers.

SUMMARY

According to the present invention, by adjusting the size of a slot, the amount of data per slot (and hence the data rate) can be usefully adapted in response to user needs and propagation conditions. A combination of spread-spectrum modulation is applied and pulse-position modulation using independently coded and delayed in phase and quadrature components along a variable slot structure to permit a variety of data rates to be achieved while making it difficult for an unintended receiver to locate the signal source or intercept message content. Other novel features such as signal acquisition, synchronization, frequency hopping, start time randomization, and transmitter power control are also defined within the scope of the invention.

The preferred embodiment of the invention includes a method for generating a low probability of detection/low probability of interference (LPD/LPI) waveforms is presented. The method modulates pre-modulated symbols using pulse-position modulation (PPM) to produce PPM modulated signals with a modulated in-phase (I) component and a modulated quadrature (Q) component. Next, frequency hopping is used to transmit the modulated I component at a randomized start time within a time slot and to transmit the modulated Q component at the randomized start time within the same slot. The modulated Q component does not overlap with the modulated I component in the slot. The method can also overlay transmission security (TRANSEC) pseudorandom (PN) overlay on the modulated Q component and the modulated I component before the modulated Q component and the modulated I component are transmitted.

Other configurations of the preferred embodiment of the method can contain other useful actions and features. For example, the method can receive data words and Reed Solomon forward error correct (FEC) the data words to produce the pre-modulated symbols. The method can chip-shape filter the pre-modulated symbols to produce modulated signals that are root raised cosine signals. The method can also modulate the I component and the Q component onto a time slot that is about 2.5 milliseconds long with about 2500 chips across that time slot. The modulated I component can have a duration of about 143 chips and the modulated Q component can have a duration of about 143 chips. In some configurations of the preferred embodiment, a bit error rate (BER) and a signal to noise ratio (SNR) of data received at a receive antenna can be determined and then the transmit power used to transmit the modulated I component and the modulated Q component can be adjusted based on the BER, SNR and a transmitted power level received in a received frame.

Another configuration of the preferred embodiment is a system for generating a low probability of detection/low probability of interference (LPD/LPI) waveform. The system includes a modulation logic that receives quasi-orthogonal code (QOC) symbols and encodes the QOC symbols using pulse-position modulation (PPM) to modulate the QOC symbols to generate a modulated in-phase (I) component and a modulated quadrature (Q) component. The modulation logic modulates the I component with a random start time onto a time slot with a fixed length as well as modulates the Q component onto the time slot with a random start time so that pulses of the I component and the Q component do not overlap each other in the time slot. Transmit logic uses frequency hopping to transmit the I component and the Q component in the time slot.

In other configurations, the system can include overlay logic that overlays a pseudorandom (PN) overlay on the Q component and the I component before the Q component and the I component are transmitted. Additionally, forward error correction (FEC) logic can forward error correct and interleave raw symbols to produce the QOC symbols. In some configurations, the modulation logic, the overlay logic and the FEC logic are formed as part of a system on a chip. State machines can be used to control the modulation logic, the overlay logic, FEC logic and other logic on the chip.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 8 is an example drawing showing Operating Mode Parameters—by varying MTSC symbol size and the number of active regions, the LPI/LPD waveform data rates can support a wide variety of applications.

FIG. 9 is a drawing showing preset service availability—the services supported by the LPI/LPD Mode increase as threat situation permits selection of presets with higher data rates.

FIG. 14 is an example drawing showing Range Ratio vs Operating Mode for 175- and 30-MHz Spectrum Use—for Hata Okamura propagation, using only 30-MHz of spectrum supports a 3:1 or better solution at data rates up to 27 kb/s, but using 175 MHz of spectrum enables a 3:1 or better solution at all data rates.

Similar numbers refer to similar parts throughout the drawings.

DETAILED DESCRIPTION

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

In the preferred embodiment, the LPI/LPD waveform can achieve a 3:1 Communication-to-Intercept (C/I) range ratio or better as needed for some applications, and gives users presets to balance data rate with probability of detection. Example applications would be as part of the SRW or WNW waveforms.

Figures 1, 2:
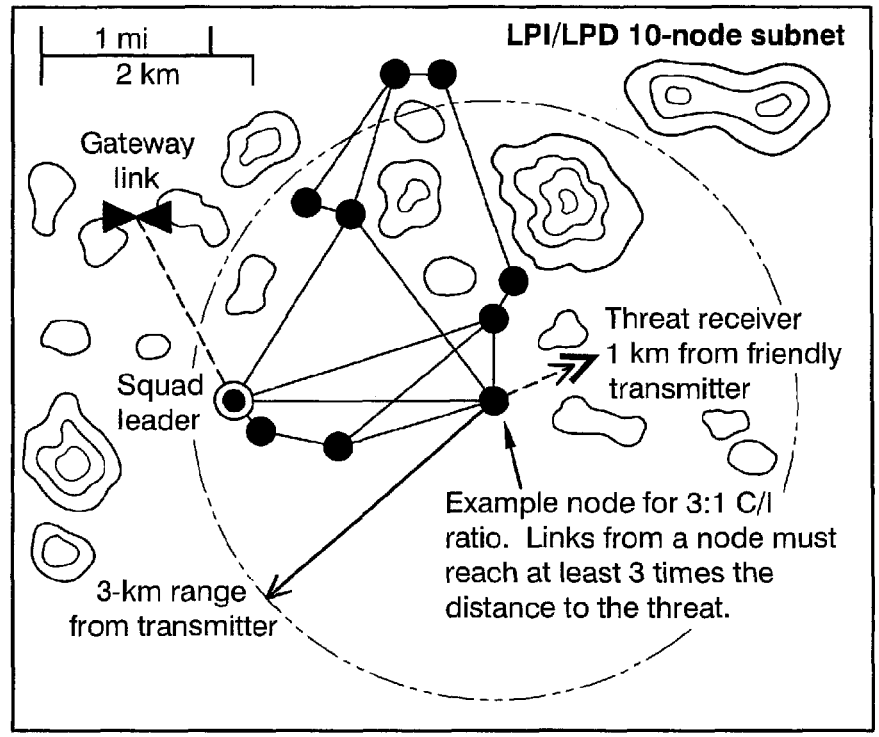
FIG. 1 is an example drawing showing LPI/LPD CONOPS: The LPI/LPD waveform requirements for a 3:1 communication to intercept (C/I) ratio at 100 kb/s is achievable in the Data channel with 30 MHz of the 175 MHz available in the UHF spectrum.
FIG. 2 is a table showing exemplary data for operation in the UHF band, having C/I range ratios of 3:1 or higher for all operational modes.

FIG. 1 illustrates the C/I KPP for an application. The communications network must avoid detection by radiometric $2^{nd}$- and $4^{th}$-order and cyclo-stationary detectors 1 km from the sender while the sender is able to maintain a 3-km or longer link with another communications node. Similar propagation channels to the friendly and threat receivers are assumed.

An interceptor analysis showed that the preferred embodiment of the LPI/LPD waveform is a fully compliant solution when radio nodes capable only of nearly instantaneous bandwidths of 1.2 MHz and essentially use all of the available noncontiguous 30 MHz of spectrum. It is assumed that the radios use an equal distribution of transmit and receive slots and the interceptor has no knowledge of channel allocations, which means the interceptor must monitor the entire UHF band from 225 to 400 MHz. A 3:1 C/I range ratio is achieved for user data rates up to 140 kb/s.

FIG. 2 illustrates the results for each LPI/LPD Mode preset. A featureless waveform undetectable to $2^{nd}$- and $4^{th}$-order and cyclo-stationary detectors have been developed and are described herein. The preferred embodiment waveform suppresses chip and hop-rate features and controls transmitter power to meet receiver sensitivity. FIG. 2 provides analyses supporting this claim. Key elements of the LPD/LPI waveform are listed at the right of that Figure.

Note that this waveform is compatible with existing Slot, Epoch, or Super Epoch structure in waveforms such as SRW thereby ensuring compatibility with existing upper layers and maximizing reuse within those layers. It can also be used with other slot/epoch structures.

Also of importance is that of limiting waveform complexity. Analyses of the preferred embodiment of the LPI/LPD design fits within a Field Programmable Gate Array (FPGA) and Digital Signal Processor (DSP) resources available in many legacy designs.

Finally, note that this design includes a robust synchronization process built upon the same signaling format as that of the data segment thereby allowing reuse of firmware resources and creating a uniformity throughout the signal in space which, if not the case, could produce a detectable feature.

The spreading in time and frequency incorporated in the preferred embodiment LPI/LPD waveform infuse the waveform with diversity characteristics that enhance its ability to function in battlefield environments that include fading, co-site and co-channel interference, and both conventional and sophisticated electronic warfare (EW) threats.

The existing non-LPD/LPI waveform modes have the following vulnerabilities:

Long dwell times on a single carrier which concentrates energy making it detectable to channelized radiometric detectors which is mitigated by fast frequency hopping.

Power management with periods, such as discovery and net entry, of high-power transmission create time periods of detectability and is mitigated by a revised power-control algorithm Transmit chip shaping that leaves detectable spectral-line features which is mitigated by root-raised cosine chip shaping.

Fixed transmit opportunity times introducing periodicity in the signal, especially for time division multiple access (TDMA) voice and is mitigated by Multi-Time-Shift Keying (MTSK).

Lack of power controlled network mitigated by power-limit parameter sub-mode selection preset for the LPD subnet.

Each of these deficiencies is addressed in the preferred embodiment of the LPD/LPI waveform design with the use of frequency hopping, power control, chip shaping, and randomized transmit start times.

Figure 3:
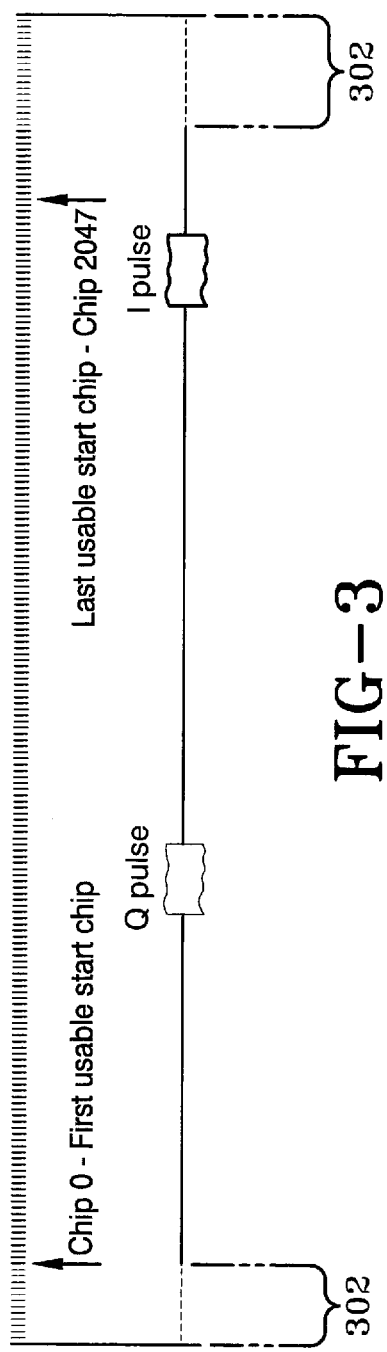
FIG. 3 is an example drawing showing 2.5-ms slots divided into 2500 1-μs chip times, with single active region of 2048+142 chips.

Fast frequency hopping was used between slots to break up the long dwells at fixed channel frequencies present in the non-LPD/LPI waveforms. In addition to randomizing frequency, randomizing the start times of the transmit pulses was also used which avoids a regular periodicity that is more easily detectable. The preferred embodiment of the present invention uses a pulse-position modulation to carry information bits in the location of each pulse. As shown in FIG. 3, an exemplary 2.5-ms time slot has two short bursts labeled "I pulse" and "Q pulse." This is for LPI/LPD preset 1.

With a 1-MHz chipping rate in the preferred embodiment, there are 2500 chip intervals of 1 micro seconds each in the slot. The I and Q pulses are each placed at 1 of 2048 possible start locations, so each carries 11 bits of information in its location. Guard times 302 of about 250 microseconds provide time for RF tuning control and settling between slots. Randomness in the information bits, which is further randomized by the Transmission Security (TRANSEC) overlay, results in a natural randomness in the transmit pulse start times. I and Q pulse each carry the same barker code of a particular length, in this case 143 chips. A 143-bit TRANSEC pseudorandom (PN) overlay distinguishes I from Q. At the receiver, these overlay sequences ($P_I$ and $P_Q$) are stripped off and the results are passed into correlators looking for the Barker code. A hit on the I or Q correlator identifies the location of that pulse and the information bits carried thereby. The two pulses are placed independently in the active region so together they carry 22 bits. This modulation is a type of M-ary signaling that the inventors of the preferred embodiment call Multi-Time Shift Keying (MTSK). The range of user data rates is provided by varying the quantities and the sizes of M-ary pulses in a slot.

Current non-LPI/LPI waveforms employ digital modulations such as MSK and QPSK that are an excellent choice to maximize amplifier efficiency. They also are easily detectable because they include pronounced spectral lines. For this LPI/LPD waveform, the preferred embodiment replaces the pulse shaping normally used for these waveforms with a root-raised cosine pulse, a choice that eliminates these lines making the transmit spectrum like band limited white noise.

Power control characteristics are also to be dealt with in the LPD/LPI waveform design. Some non-LPD/LPI waveforms include power control functionality. Often, this functionality is designed primarily to minimize power usage and maximize battery life while not detracting from network operation. However, periods of high transmit power during network startup, network entry, and neighbor discovery increase the detectability of the network. The preferred embodiment waveform reuses these capabilities to the fullest extent possible with modification to reduce the deleterious impact of high power bursts.

As FIG. 1 illustrates, node locations have a significant impact on detectability. Users that are closer to interceptors are more likely to be the cause of network detection. The Power Control functionality of the preferred embodiment incorporates the sensing of key receiver metrics—SNR and BER—enabling the required transmit power to be determined. This, when combined with power constraints that limit transmit power to the range considered safe, avoids potentially detectable transmissions.

The 1.2-MHz channel bandwidth and 30 MHz of total spectrum are severe constraints when the concept of operations (CONOPS) requires LPI/LPI with high bit rates. This is because the energy conveying information at a given rate is concentrated in relatively narrow channels and the radios are incapable of extremely fast digital frequency hopping across the allocated spectrum.

Figure 4:
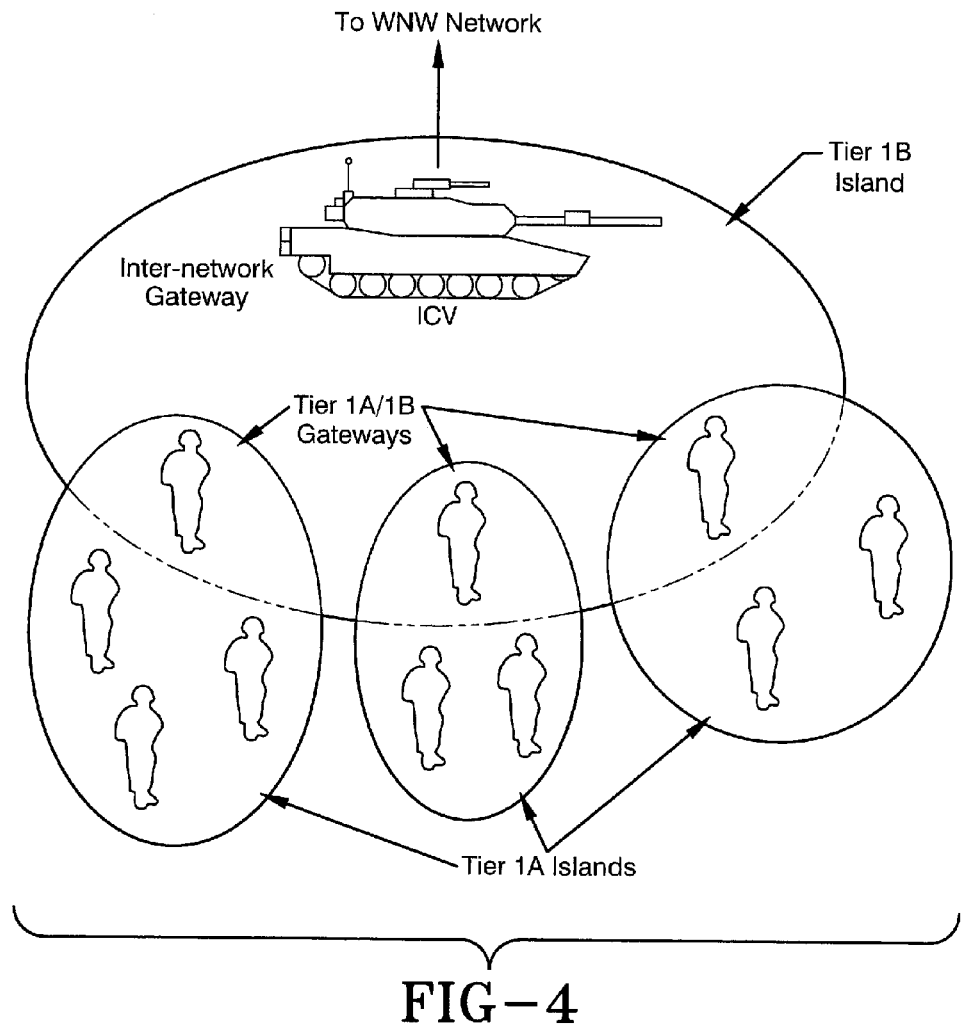
FIG. 4 is an example drawing showing Notional SS application Network—different islands may operate in different modes but the 1B Island must operate in a mode with equal or greater information capacity than any 1A Island.

The level of covertness of a LPI/LPD waveform is inversely proportional to the data rates supported so a reduction of detectability requires a reduction in data rates and services supported by the link. Since operational threat situations vary, the preferred LPI/LPD Mode permits users to select the best balance between protection and services. Each transmitter can select a different level because radios can receive any preset at any time in the LPI/LPD Mode. Operators closest to threats can use the most protective level while those farther away can select higher throughputs. The LPI/LPD waveform can be used for three exemplary applications: Soldier System, Unattended Ground Sensor-Intelligent Munitions System (UGS-IMS) and the Tele-Ops (TO). The Soldier System application requires voice and data communications for dismounted soldiers both between the dismounts and back to their supporting vehicles. Communications access beyond the Soldier System network is provided through Inter-network Gateway nodes. A notional SS network deployment is illustrated in FIG. 4.

The UGS-IMS application supports a single lower tier network. This application provides data and imagery services to its users. The TO application supports a point to point link between an Active Controller and a UxV (Unmanned Airborne Vehicle (UAV)/Unmanned Ground Vehicle (UGV)) under remote control by the controller. Communications in this domain support control messages from the controller to the UxV under control. The UxV sends Video and Status information back to the controller.

The fundamental requirement for LPI/LPD is to minimize the received signal energy needed for successful interception by the threat receiver. There are three key design goals that support that requirement. First, spreading of the signal's spectrum over as wide an instantaneous band and as large a cumulative bandwidth as permitted by the radio hardware and spectral availability. Second, suppression of waveform features that an interceptor could exploit to identify the signal's type and source or detect the signal's presence in the kinds of highly dynamic non-stationary background noise environments that often frustrate classic radiometric interceptors. Third, minimization of received energy needed for successful communication. A key design requirement here is to capitalize on the diversity inherent in the spread spectrum waveform to combat the signal fading caused by multipath propagation. The signaling scheme should also be scalable to address the different data rates necessary to support the variety of services given the different capabilities of the target radios.

Figure 5:
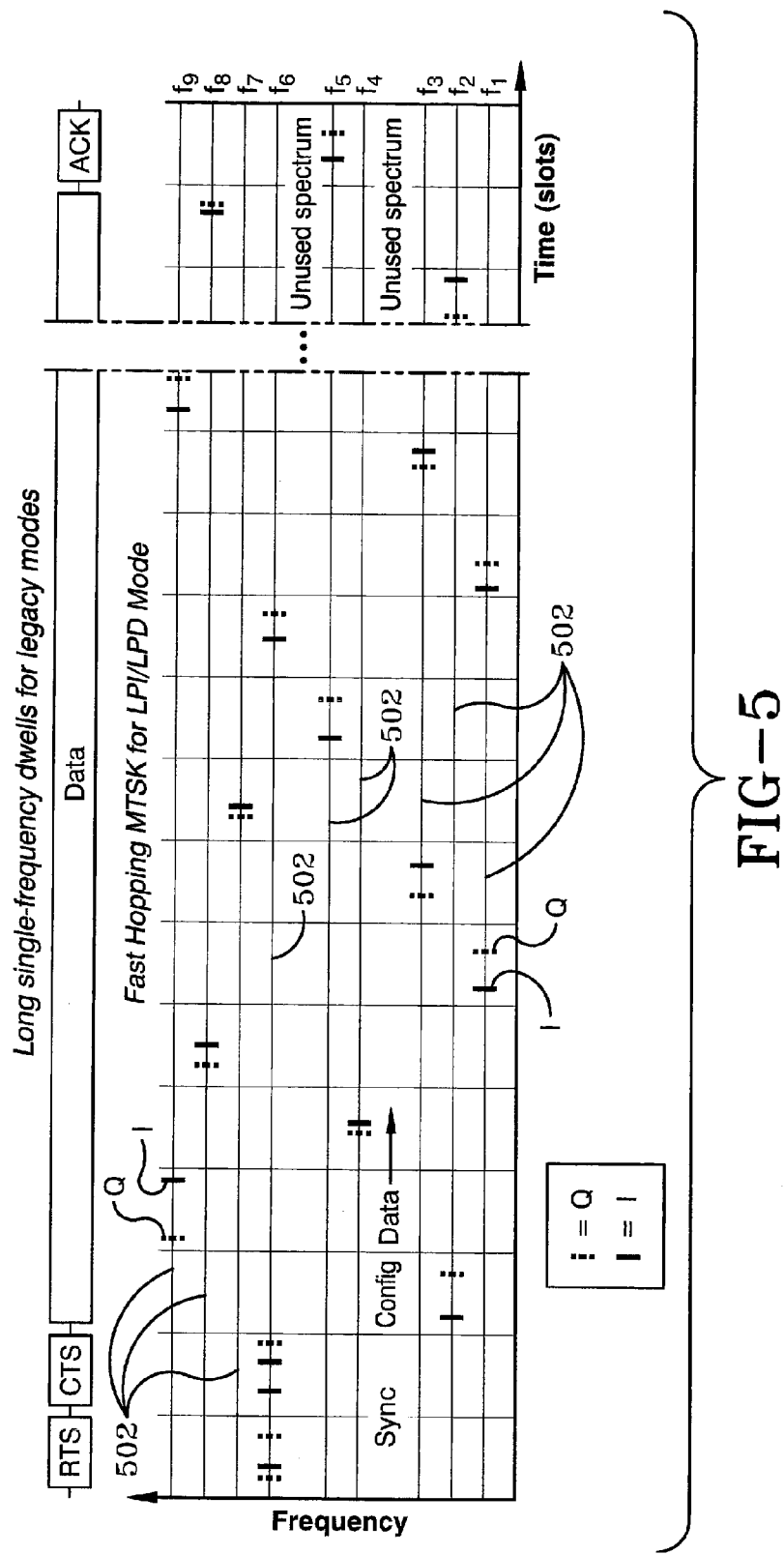
FIG. 5 is an example drawing showing the LPI/LPD Frequency Hopping—LPI/LPD Mode hops over all of its allocated (potentially non-contiguous) channels with uniform random selection based on TRANSEC from the crypto.
Figure 6:
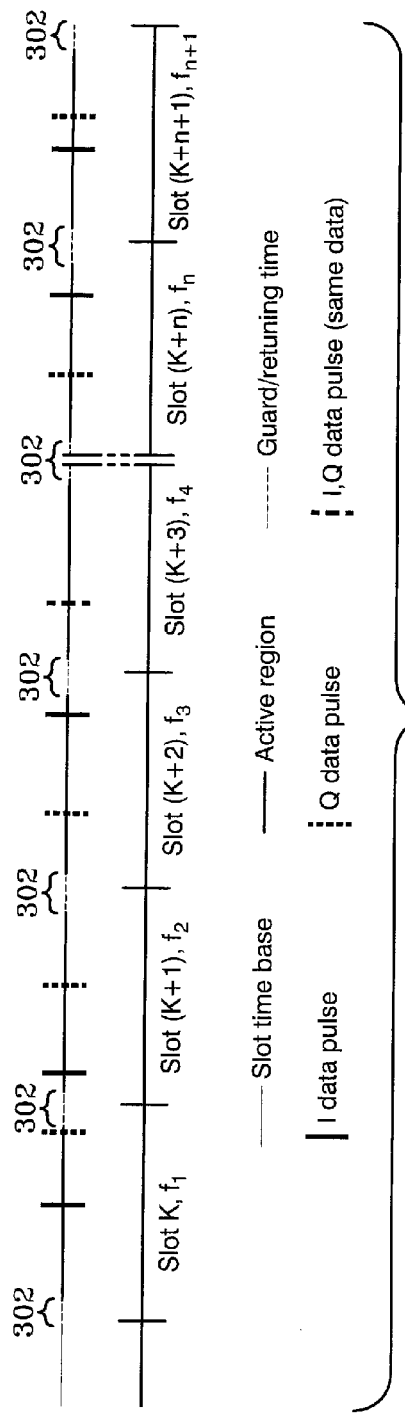
FIG. 6 is an example drawing showing multi-slot MTSK Transport—multiple slots of data each carrying an I and Q Multi-Time Shift Key pulse.

These are addressed in the following sections on (1) Frequency and Time Randomization, (2) Chip Shaping, (3) Power Management, and (4) Acquisition and Synchronization. Non-LPD/LPI waveforms apply what is known as frequency agility, which in general results in dwelling on an allocated channel until conditions suggest a change in carrier. This is depicted in the upper portion of FIG. 5 showing that a complete Epoch and its content dwelling at a fixed carrier frequency over the time period of the Epoch. Note that time is the horizontal axis. The LPD/LPI waveform, when allocated several carriers 502 as depicted in the lower portion of FIG. 5 as swaths across the vertical frequency axis, are potentially non-contiguous. A Sync segment of 1 or 2 slots in duration will carry random MTSK pulses with known transmit times enabling the acquisition of a time reference. A Configuration/Confirmation (config) slot will carry data in a standard MTSK slot, data that will identify the Preset Mode present in the Data Slots to follow in the Data Segment of the Epoch. This data segment will consist of multiple slots with frequency hopping at slot boundaries. Q blocks and I blocks in this diagram begin time periods of pulse transmission of Q symbols and I symbols respectively. Consider the Multi-Time Shift Key (MTSK) signaling scheme pictured first in FIG. 2 and again in FIG. 6. In these figures, there is a single active region having 2048 potential positions for the 143 chip sequence which at the 1-MHz chip rate leaves a 309 µs guard time for retuning the synthesizer for frequency hopping or switching from transmit to receive. Thus, by adjusting the transmit time, the preferred embodiment can carry in these possible 2048 locations 11 bits of data. Both I and Q signal streams carry this data, therefore they carry a total of 22 bits of data in a single slot. This leads to a data rate of 22 bits in 2.5 µs, or 8.8 kb/s.

It should be recognized that this signaling scheme transmits a known sequence on I and on Q. These sequences are different so that I and Q can be distinguished. They are Quasi-Orthogonal Codes (QOC) having good auto-correlation properties as well as superior rejection when cross-correlated. This is done in two steps: first the TRANSEC overlays applied to I and Q are applied to both I and Q in the receiver. This restores the I and Q stream to its QOC state. Then these four streams are passed through the QOC receiver match filter and a magnitude computed. This guarantees the capture of the I and Q start events regardless of their appearance on the I or Q rails. Once determined, the start event indices are decoded to produce the 22 bits received.

Figure 7:
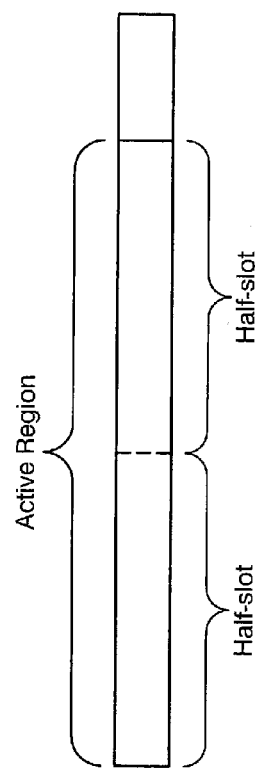
FIG. 7 is an example drawing showing division of active region—dividing the active region into two sub-regions permits two MTSK transmissions and higher data rates.
Figure 10:
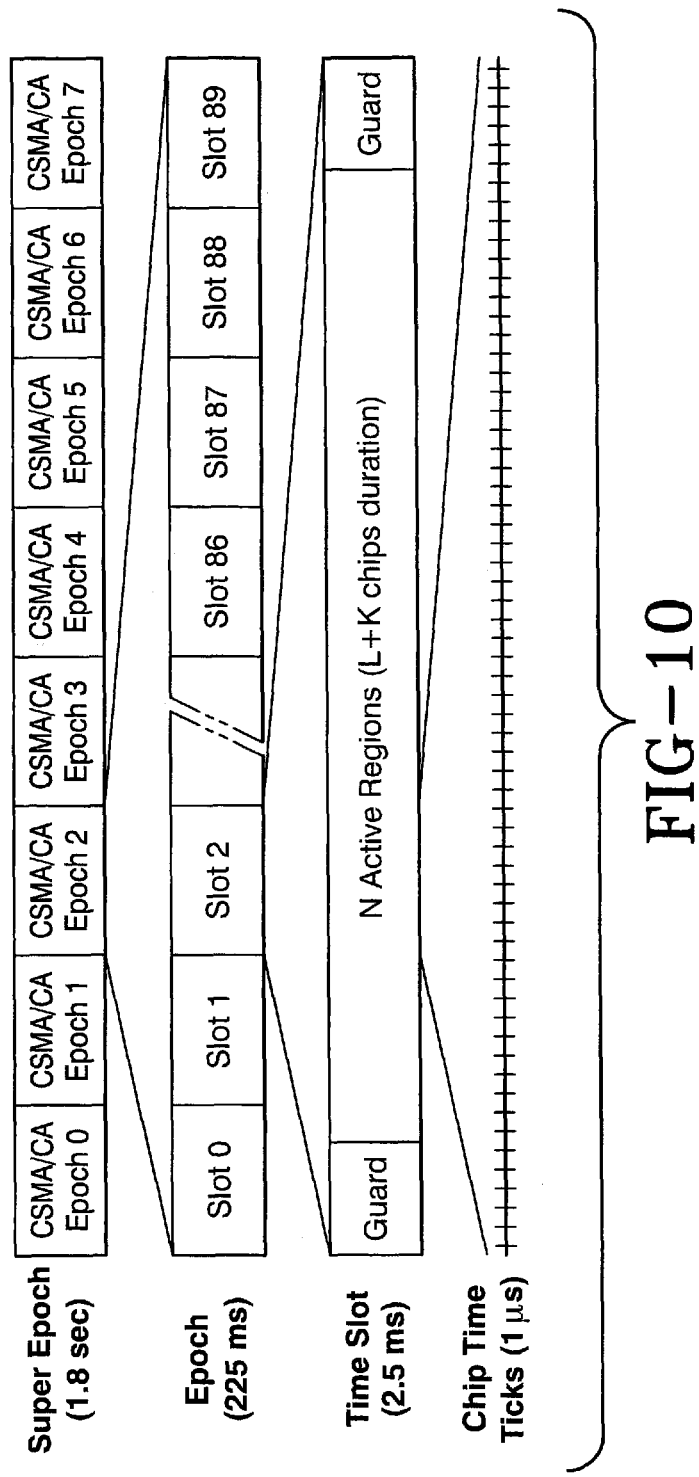
FIG. 10 is an example drawing showing Epoch Timing Structure—the LPI/LPD waveform is structured to fit into the same timeline as that of existing waveforms.

The MTSK QOC signaling scheme is scalable to different data rates. This is illustrated in FIG. 7 where the Active Region is divided into two sub-regions providing two MTSK opportunities per slot, each with half the available positions. This figure shows two half-slot modulation intervals leading to 1024'ary modulation (on both I and Q). The 1024 chip regions can each carry 10 bits of data on I and on Q, or 20 bits each for a total of 40 bits per slot.

Further sub-divisions result in higher data payloads per slot. A complete set of operating modes supporting the variety of services given the different capabilities of different radios are shown in FIG. 8. The proposed LPI/LPD waveform signal in space (SiS) user data rate support a wide range of services that are selectable by the network participants through the use of radio presets that define the modes of operation, data rate and power limits. A list of potential presets that illustrate a gradual increase in services is presented in FIG. 8. In the table, the lower numbered presets exhibit the most limited services while providing the most capable LPI/LPD performance.

The proposed LPI/LPD Waveform SiS user data rate support a wide range of services that are selectable by the network participants through the use of radio presets that define the modes of operation, data rate and power limits. A list of potential presets that illustrate a gradual increase in services is presented in FIG. 9. In the table, the lower numbered presets exhibit the most limited services while providing the most capable LPI/LPD performance.

The SS application is subject to unique environmental characteristics that drive the design of an efficient communications waveform. The use of the higher order QOC signaling alphabet and a Reed Solomon (RS) block code provides an extremely power efficient modulation scheme even with code rates as high as ⅞. In the ground to ground environment in the Ultra High Frequency (UHF) band, it is not uncommon that the communications channel has a coherence bandwidth of 1 to 2 MHz. The impact of this is that there will be frequency channels that will exhibit the phenomena of 'Flat Fading' resulting in hop frequencies that will provide little if any information. The preferred embodiment will use a lower code rate of ¾ with erasure processing to minimize the additional transmit power necessary to provide adequate link margin.

Regarding Power Control, note that since the MTSK signaling scheme exhibits a high degree of randomness in both time and frequency, it helps to minimize the received energy needed for successful communication. A key design requirement here is to capitalize on the diversity inherent in the spread spectrum waveform to combat the signal fading caused by multipath propagation. Proper coding will obviate the need to provide significant power to overcome these fades and leave the operator susceptible to intercept and compromise. Thus, this signaling approach and the frequency diversity thereby derived will improve link margin and allow link operation at lower transmit powers.

The SS application needs voice and data communication, so the preferred embodiment of the invention addresses both Carrier Sense Multiple Access (CSMA) with Collision Avoidance data services and TDMA voice services. The LPI/LPD Enhancement ground rule is that the mode's timing and overhead must be compatible with supporting the voice and data services without causing more than minor changes in the layers above the LPI/LPD PHY. The preferred embodiment timing and slotting structure, illustrated in FIG. 9, supports the data and voice services without causing major changes in upper layers.

The choice of a 2.5-ms slot duration provides for sufficiently random frequency hop dwells for all LPI/LPD presets. The resulting hopping rate is reasonably rapid and the waveform isn't overly burdened by the re-tuning time for each hop. The 2.5-ms slot duration provides enough time for significant random time jitter of the MTSK pulses. Each slot is divided into time ticks at a 1-MHz rate, 2500 ticks per slot. This aligns with the 1-MHz chipping rate and uses the time tics for the MTSK pulse-position modulation. Approximately 85%, or 2252-µs of the 2500-µs slot contains the time-randomized pulses across the 12 presets. This leaves an average guard time of 348 µs for clock offsets and propagation. This guard time is compatible with the radio retuning times providing stable frequencies for transmission and reception.

The data uses CSMA services and the voice uses TDMA services. The Soldier System (SS) application may provide a Combat Radio Net (CNR) service for the voice traffic. The burst modulation format of the LPI/LPD waveform is structured to fit into a similar timeline such as for the SRW signal in space (SiS) while still maintaining the random time of transmission inherent in the MTSK signaling format.

Figure 11:
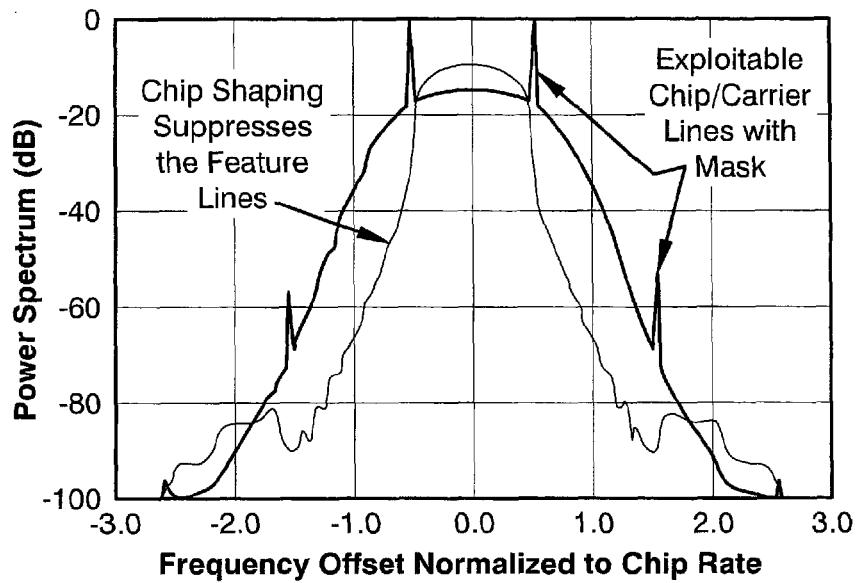
FIG. 11 is an example drawing showing SiS spectrum with and without chip shaping—existing SRW modes produce spectral lines that the LPI/LPD mode eliminates by using Nyquist pulse shaping.
Figure 12:
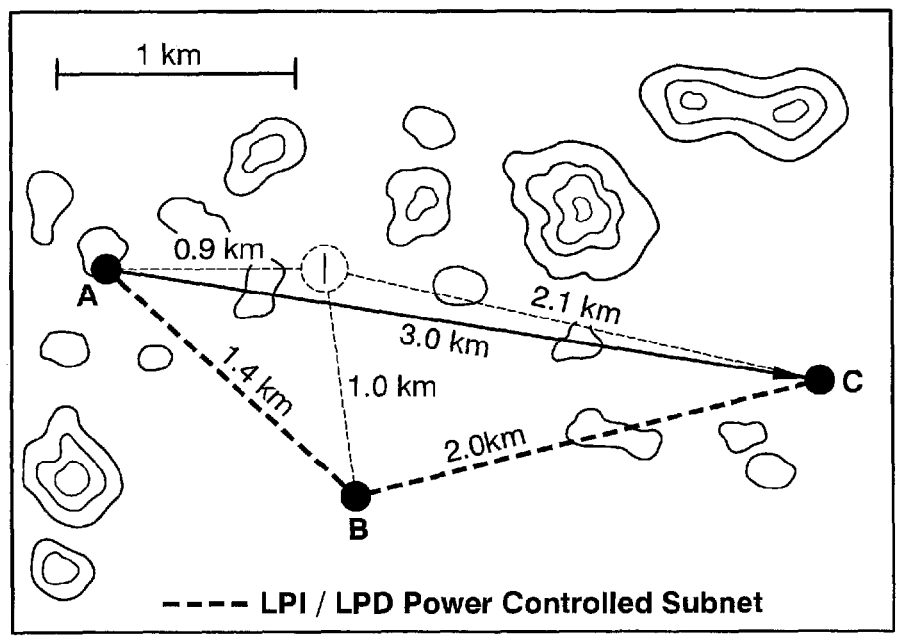
FIG. 12 is an example drawing showing Power Management to avoid detectable transmissions—power control limits preclude transmissions from A to C, but naturally result in routing from A through B to C.

An exemplary Non-LPD/LPI modulation is Quasi-band limited Minimum Shift Key (QBL MSK) modulation. Minimum Shift Keying (MSK) is a form of frequency-shift keying that uses two frequencies (positive and negative phase-shift rates) to carry one bit during a chip interval. Quasi-band limiting shapes the MSK modulation to reduce its bandwidth relative to pure MSK. Even with that shaping, the frequency-shift keying has pronounced lines in the waveform spectrum at the upper and lower keying frequencies. These are readily detectable features. The spikes in FIG. 11 illustrate these exploitable features.

The preferred embodiment of the invention addresses this issue in its LPI/LPD waveform by moving away from an MSK-based waveform to a Nyquist pulse, e.g., the root-raised cosine (RRC). Ideally, the spectrum of a Nyquist pulse that is infinite in time is band limited and flat, i.e., equivalent to that of band-limited white noise, and therefore featureless. As the pulse time duration is shortened through truncation or shaping, the spectrum expands and is no longer band limited. However it remains white in its essential character becoming less white as the time span for the pulse decreases. A finite-duration Nyquist pulse can be used which has the chip-suppressed pulse spectrum shape indicated in FIG. 11. In addition to defeating chip-rate detection, using the RRC instead of a raised cosine pulse has implementation benefits. It is only slightly more complicated to implement than an MSK pulse, the truncated RRC spanning some small number of symbol periods, and the MSK pulse only spanning one. It can be readily realized in an FPGA using a Finite Impulse Response (FIR) filter. One disadvantage of a Nyquist versus an MSK pulse is an increase in the peak-to-average power level, which is mitigated by using a power amplifier back-off. This increase can be limited nevertheless—to less than 1 dB—by using a larger excess bandwidth coefficient.

Many wireless systems apply power management (PM). PM is designed to support the conflicting design goals of reliable network operation and long battery life, and as such it does not seek to limit the power consistently over time. At times the current PM may boost power to improve Startup, Discover, and Net Entry, resulting in potential detection vulnerability. The preferred embodiment waveform intent uses the existing PM of a wireless system to the greatest extent possible, to analyze the current design to identify detection issues and possible modifications to address those issues, and modifying PM accordingly to address those issues.

An important element of power control is the capture of signal metrics indicating the state of the links to which you are currently communicating. Estimation of SNR involves the estimation of the channel complex gain using the known sync transmit sequence, and the separation of the signal from the noise data in this received signal stream. Given this one computes a signal-to-noise power ratio. BER can be determined using the bit error corrections occurring through Reed Solomon decoding.

Power control in the preferred embodiment of the LPI/LPD waveform results in two enhancements important to LPI/LPD: (1) faster power adaptation that acts to keep nodes operating near sensitivity and (2) application of transmit power level constraints to preclude transmitting at levels deemed dangerous. The preferred embodiment of the invention includes in the transmitted Config/Confirm header information of the transmitted power level being applied over the arriving epoch. This enables a fast control of the transmit levels between nodes without the need for power measurement feedback. The receiver uses this information in conjunction with locally computed SNR and BER estimates to determine the transmit power he would need to use to reach back to that node successfully, assuming a symmetric channel. Then, when he transmits back to that node, he includes in his message the new power level used. The originating nodes respond in kind, resulting in a pseudo-feedback power control algorithm. This not only enables faster power adaptation between nodes that are responding to changing channel conditions, but it also enables an important LPD/LPI feature—power level constraint—the limiting of transmit power between users by allowing transmission events that do not violate prescribed power constraints. Consider the network layout in FIG. 11. Node A is within 1 km of Interceptor I and 3 km from node C. Node C can be heard by Node A but is far enough from I to avoid detection. Transmission from A to C would result in interception. Node A receives from B and C determines the needed power levels to respond, but only Node B's required power level is less than the allowed power constraint, so the transmission to C is not attempted, and interception avoided.

Figure 13:
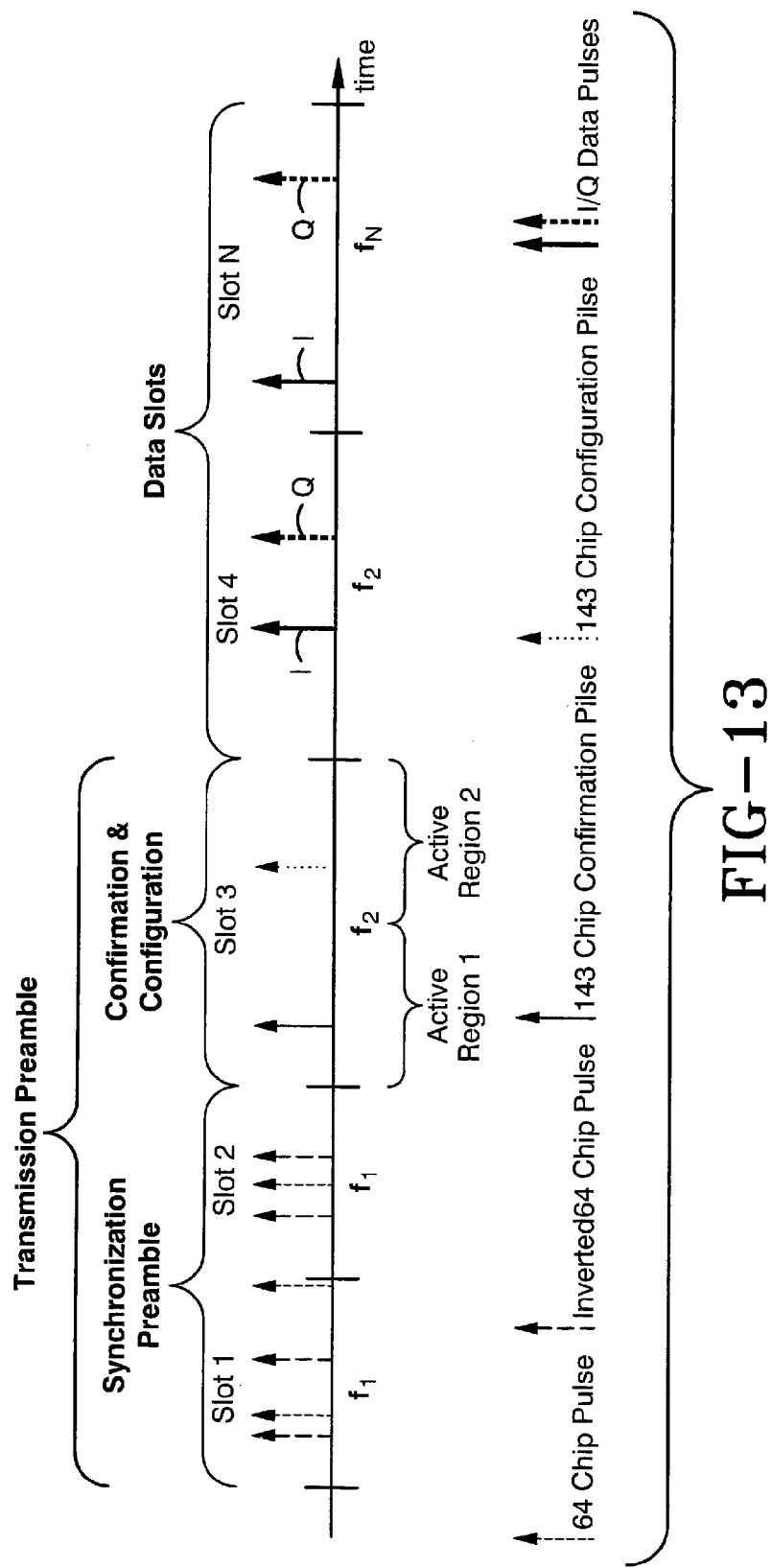
FIG. 13 is an example drawing showing Transmission Preamble and Data—all data transmissions (RTS, CTS, Packet Data, Voice Data) make use of the same MTSK waveform construct, enabling reception by a compact set of FPGA firmware resources, enabling realization within the limited resources of SRW radio platforms, and resulting in a consistent LPI/LPD signature across the waveform.

An LPI/LPD Mode burst transmission's acquisition and synchronization is established by a transmission preamble, shown in FIG. 13. The preamble is an SiS structure used for the LPI/LPD data and voice transmissions types: RTS, CTS, Packet Data, ACK, and Voice. The transmission preamble consists of a synchronization segment followed by a confirmation/configuration segment. In the case of an RTS transmission for example, the data slots would carry the RTS; when transmitting voice, they carry voice data, and so on.

Some of the benefits of this approach include:
The same waveform construct built upon MTSK signaling is throughout, so there is no exploitable Transmission Preamble feature.
Power density, time and frequency randomization are consistently applied through the entire waveform, avoiding fluctuations or other detectable characteristics.
Using a common waveform construct throughout the waveform enables use of a common set of FPGA resources to reception of Sync Slots, Confirmation/Configuration Slots, and Data Slots, so the LPI/LPD signal in space is realizable within the limited resources of small-form factor radios.

Synchronization Preamble—The sync preamble extends over two 2.5-ms slots and enables time synchronization. Both slots make use of the same carrier, thereby allowing the sync process to achieve coherent reception over a longer time period. It includes randomization constructs derived from the TRANSEC generator for this single transmit frequency, Pseudo-Noise (PN) overlay, pulse phase inversion and pulse start time. Over these two slots, a 64 chip random sequence is transmitted seven times. It is randomly inverted over the course of the slot making it impossible to exploit any phase coherence over this longer, 2-slot duration. Each of these sequences is also transmitted at a random time within the slot. This construct provides significant gain while making use of the same QOC combining structure used in demodulation by using a binary symbol that does not overly constrain the system's digital hardware.

A total of 448 chips are transmitted in two slots; compared to the 143 transmitted on both I and Q over two slots, totaling 572. Thus the time duty cycle is similar making the power density similar too. Of course this will vary in the other modes when additional Active Regions are in use during a slot; the impact of which can be evaluated and adjusted. The presence of 448 chips provides the sync with approximately 5 dB of margin over the slot data that follows, carried on a 143-chip pulse.

Confirmation and Configuration—Following the Synchronization Preamble is a second slot transmitted on its own random frequency that provides Preamble Confirmation followed by a Configuration Code. It will consist of two Active Regions, the first carrying a single pulse to be used for Confirmation, and the second region carrying operation mode or Configuration data.

The Confirmation is used as the first line of defense against false alarms—its time of arrive is known apriori, so the receiver will look for it and confirm its presence. If it is not present, a False Alarm is declared. It will also be used to provide refinement of the time reference deriving any correction necessary to the local clock by comparing against the expected differential delay between the two set times of preamble and confirmation.

Since all receivers in the network must be capable of determining on the fly the rate at which the data was transmitted, a Configuration Code can be used to identify the data rate through one of eight different identifiers or another number of identifiers. These eight codes identify the paired number of active regions and QOC Symbols to be used in subsequent slots of the transmission. In the preferred embodiment, tt uses the 143 chip QOC Symbol transmitted in one of eight random and noncontiguous 1 μsec intervals in the second active region of the slot. These eight positions are mapped into the three bits necessary to identify the signaling format to follow.

Data Slots and Discussion—Data slots can carry either RTS, CTS, Voice or Packet data. These will be of various durations in terms of the number of slots as needed to carry those data sets at the data rate identified by the Configuration Data. This process can take advantage of the high level of Es/No afforded by the use of the higher order signaling alphabet of the QOC modulation format. This is especially useful for the lowest data rate operating modes that signal at the lowest possible transmit power. The processing gain of 21.6 dB that is provided by the 143 chip spreading sequence ensures that the energy necessary to reliably acquire and synchronize to the received packet can be accomplished within the signal processing available to the receiver.

For CSMA data exchanges, a Transmission Preamble precedes the Transmitting Station's RTS. If the destination node is not radio silent, a CTS message is sent in return, and communication and message processing proceeds as in the normal operational modes of the SS application. The maximum data rate that is supported for each of the data modes is determined by the preset configurations of the waveform to minimize the risk of compromise. Voice messages are of moderate duration and use the TDMA Epochs of the time domain. They require additional overhead for the setting up and tearing down of the circuit. This overhead is transported as data immediately following the Transmission Preamble.

Determination of the operating point—To determine the receiver operating point for the LPI/LPD Waveform, a reasonable budget for dropped messages should first be allocated. For the specified probability of successful message reception of 99% for the maximum length packet, the 1% probability of lost message must be budgeted among all failure mechanisms. These mechanisms are dropped packets due to bit errors, missed packets due to failed synchronization and packets missed while servicing a false alarm by the detector. The same acquisition process can be used for all burst rates in the system necessitating a robust acquisition to meet the needs of the strongest LPI/LPD modes while not significantly reducing the throughput at the higher burst rates. Given the need for a robust acquisition the preferred embodiment of the invention can allocate the 0.5% of the 1% budget to failed sync and false alarm and the other 0.5% to erroneous bits in the payload.

At the lowest burst rate of 8.8 kb/s, the required SNR for the 143 chip QOC Symbol is 11.8 dB at the input signal level corresponding to this a 64 chip matched filter provides an 8.3 dB SNR output. Combining seven of these pulses using the same process as used for decoding the QOC Symbols results in a total SNR of 16.8 dB; which is sufficient to provide a highly robust acquisition process for any two associated nodes. The maximum time lost to servicing a false alarm is six time slots or 30 milliseconds. A constant false alarm rate detector set at one in five seconds will achieve a probability of preamble detection in excess of 0.995 including the effects of both failure mechanisms.

In the preferred embodiment, the LPI/LPD Mode can be supported by many existing radios without any hardware change. The LPI/LPD performance of the members of the network is largely a function of the instantaneous bandwidth and tuning time supportable by the least capable radios in the network. At present these are about 1.2 MHz and 250 microseconds, respectively. In the future, LPD performance can be enhanced as new hardware is introduced with more capable synthesizers providing faster hopping and wider Intermediate Frequency (IF) bandwidth (e.g., 30 MHz) for multi-carrier operation. Such improvements are not included in the LPI/LPD analysis given herein. They instead can be treated by future waveform enhancements as radio capabilities evolve.

Defining the following quantities:
$P_I$—power density at the interceptor
$P_R$—power density at the communications receiver
$G_P$—processing gain at the communications receiver
$G_F$—frequency processing gain
$G_T$—time duty cycle processing gain
$L_{CH}$—propagation loss difference between communications receiver and interceptor
$P_{I\_req}$—power density required at the interceptor for detection
$P_I$—power margin at the interceptor It is assumed that the communications receiver is operating near sensitivity and at a 1% packet error rate (PER). For computation of the power density at the interceptor, the technique used is the one outlined by Nicholson for a radiometric interceptor that is forced (by the randomness in the waveform) to be continuously observing the entire occupied signal spectrum. The equation for power density at the interceptor is:

$$P_I = (P_R - G_P) - (G_F + G_T) + L_{CH}$$

Power at the interceptor is the power density at the communications receiver in the instantaneous 1.2 MHz bandwidth $P_R$ less the receiver processing gain $G_P$ which for the MTSK waveform is proportional to the MTSK symbol size. That processing gain, effectively the coherent gain of an M-ary pulse equals the coherent gain associated with the number of symbols in the pulse; i.e., the symbol size, ranging from 143 to 21 as shown in FIG. 14. Frequency hopping causes additional power density reduction. For a radiometer observing a 30-MHz span relative to the 1-MHz instantaneous 99% bandwidth, this gain $G_F$ is 14.8 dB. Because the radiometer must observe continuously in time the pulses that are present with a partial duty cycle, there is a gain associated with that ratio, $G_T$. This is noted in the figure in the columns for TDMA Duty Cycle.

The interceptor, being closer than the communications receiver has a path loss advantage, $L_{CH}$, given also in the table above. It is noted that a radiometer operating in the UHF band will be unable to channelize to non-contiguous channels and interceptor is forced to observe the entire 175 MHz band and this is reflected above. In the case in which the 30 MHz is contiguous and only a 30:1 spectral ratio applies, then the results shown in the last three columns of FIG. 14 apply. Interceptor margin equals the interceptor power received less the interceptor power required for detection as specified by: $P_{I\_margein} = P_I - P_{I\_req}$.

Conditions producing a positive margin can result in detection. The probability of detection for the intercept receiver can be specified to be $10^{-3}$ over a one-second interval. To completely define the threat, it is first helpful to define a false alarm probability ($P_{fa}$) over the same detection interval to enable the intercept receiver to set a threshold. To set a meaningful threshold, the $P_{fa}$ is usually set at least two orders of magnitude below the $P_d$. The threat receiver will then use a $P_{fa}$ of $10^{-5}$ over the same one second interval. These probabilities can be achieved with a $-9$ dB SNR at the interceptor over the 30 MHz integration bandwidth.

Note that a voice waveform, for example, often uses a (80,55) Reed Solomon Code which provides enough coding gain to enable reliable Mixed Excitation Linear Prediction (MELP) performance at a channel error rate as high as 7%; this corresponds to a post detection SNR in the 9.2 to 11.8 dB range after the communications receiver matched filter. Given the processing gain of the 143 chip QOC code word, this corresponds to an improvement of 21.5 dB over the prediction SNR in the 1 MHz channel.

When considering a communication waveform in the context of a detection threat there are two elements of the problem that may be separately analyzed. First is the problem of constructing a waveform that is hopefully 'featureless'. A feature is present if there is any statistical functional defined on the signal (or signal plus noise) whose distribution differs from that of the same functional applied to pure noise in a manner other than scale, and bandwidth. Observe that scale (energy) is surely available as a discriminator no matter how the waveform is defined. One way to obtain a featureless waveform is to ensure that it is a sample function of stationary white Gaussian noise, suitably band limited. A sample function of such a noise process can be written as (sampling theorem) equation 1.

$$s(t) = \sum_n \tilde{c}_n \frac{\sin(\pi B(t - nT))}{(\pi(t - nT))} \quad (1)$$

where the coefficients are zero mean Gaussian random variables.

An interceptor might attempt to discover the chip rate, for example, since the approximate chip pulse will in fact be time limited. This potential vulnerability may be reduced by applying a dither to the start time of the respective chips so as to obfuscate the repetitive structure of the pulse endpoints. Therefore equation 2 is:

$$s(t) = \sum_n \tilde{c}_n p(t - \tilde{\tau}_n - nT) \quad (2)$$

with $\tilde{\tau}_n$ a random delay uniformly distributed from 0 to T.

The encoding of such a signal to carry information may be accomplished in several ways. One way is to simply apply a spreading process to a baseband data stream utilizing Gaussian chip amplitudes. The result will be as in Equation 1. Other more complex mappings are also possible. Another way is now presented because it is one that uses as a building block a simple modulation technique that is suitable for this waveform.

Once the featurelessness is established, the second key element of detection involves the distribution of the signal energy and information encoding over a suitable signal space. The appropriate dimension for LPD analysis is that determined by the bandwidth-time product of the fundamental communication event, D=WT. For example, an interceptor may know that communication occurs within time slots of duration $T_i$ and occupies an (instantaneous) bandwidth $B_i$.

Multiple fundamental events may be combined in a single interception attempt, and usually this is for two reasons. First, the communication signal energy per event is likely to be very small, necessitating integration (combining). Second, the stability of a detection algorithm based on a single event is very poor. This means that the distribution of the detection statistic is extremely steep and that the setting of a threshold is difficult.

The theoretical considerations clearly indicate that low-occupancy has merit for both its potential to match full occupancy LPD performance and for its more intuitive characteristic of being difficult to 'find.' The communicator should employ a waveform that is modeled on the above random subspace structure (generalized hopping). A hybrid of time and frequency hopping is appropriate and within the feasible range of implementation of the various platforms that will host the LPI/LPD Waveform.

Figure 15:
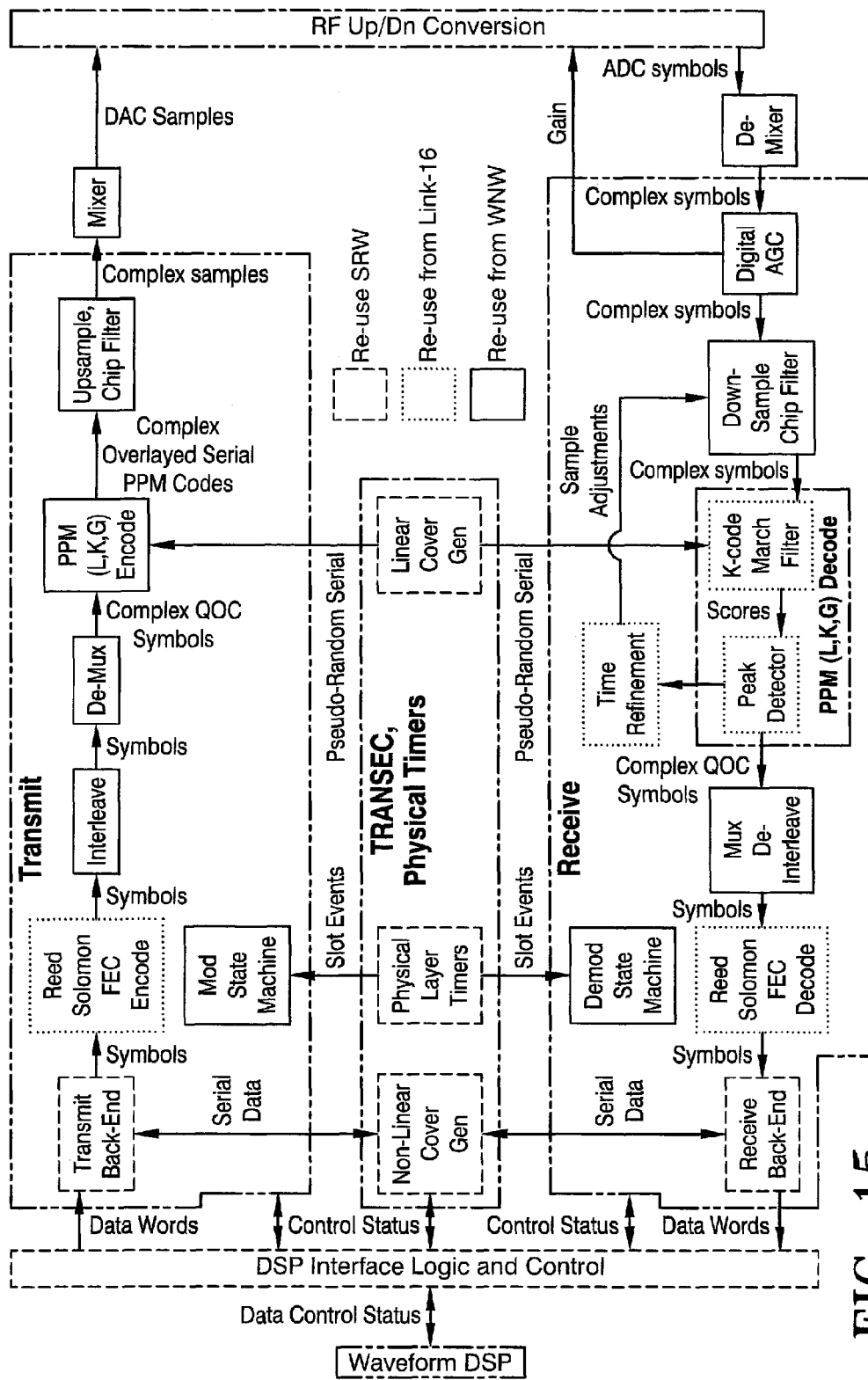
FIG. 15 is an example drawing showing FPGA Component Re-use for the LPI/LPD PHY—the LPI/LPD design can efficiently re-use proven designs from waveforms such as SRW, Link 16, and WNW.

FIG. 15 illustrates an exemplary Modem FPGA in which some configuration of the preferred embodiment of the invention may be implemented for the LPI/LPD waveform. The transmit path receives covered symbols from the transmit back-end, performs Reed Solomon Forward Error Correction (FEC) encoding and interleaving to generate complex QOC symbols. Symbols are MTSK encoded and PN overlayed. Serial data is combined into packets containing a Timing Preamble (sync and configuration/confirm segments) and a Reed Solomon encoded information bit stream forming the data segments. These are separated into MTSK symbol sized segments (Column 2 of FIG. 8), MTSK transmit time encoded, and Root-Raised Cosine chip-shape filtered. This sample stream is then fed to the Digital-Analog Conversion (DAC) for mixing and RF up-conversion.

The receive path receives de-mixed, complex I and Q Analog to Digital Converter (ADC) samples from RF down-conversion and ADC infrastructure, scales them using a digital AGC, then down-samples and passes them through chip-shape filtering. Complex samples enter the MTSK decode logic, which can be configured on-the-fly for sync detection, configuration decoding or data decoding. During data payload processing, decoded complex symbols are multiplexed to form a single symbol stream and fed into Reed Solomon FEC decoding. Corrected data symbols are loaded into the receive back-end for non-linear uncovering and reporting to the Waveform DSP.

The LPI/LPD Modem FPGA can be customized from a prior Modem FPGA by replacing the core modem logic with the LPI/LPD core depicted In FIG. 15. The LPI/LPD mode is independent of non-LPD/LPI modes and is not required to interoperate with these modes. The FPGA resources required for the LPI/LPD can fit within the existing Core Modem resource allocation used to support waveforms such as SRW and WNW. Switching between existing non-LPD/LPI waveforms and the LPI/LPD waveform may require reconfiguration of the Modem FPGA.

A single encoder and decoder which can be configured to support Reed-Solomon 5, 6, or 8-bit symbol code words can be used to support the various user data rates. Symbol width, number of data symbols and number of parity symbols per code word can be defined by the data rate.

Pseudo-random block interleavers and de-interleavers can be used for packets containing multiple code words to maximize spreading of symbols within a code word over multiple frequency hops.

The MTSK encoders will convert N-bit symbols to L+K+G chip sequences using Multi-time Shift Keying (a type of pulse-position modulation). A K-chip sequence shall be placed at position $2^N$ within an L+K sequence followed by a G-chip gap interval where no transmission occurs. Parameters N, L, K, and G can be defined by a preset selection component of the ASIC of FIG. 15.

In the preferred embodiment of the invention, programmable chip match filters will continuously search for a reference code sequence and report correlation scores and peak position for further processing. The reference code will change for sync preamble detection, configuration information decoding and data symbol decoding, allowing for re-use of the chip match filter resources to the greatest extent possible.

Time Refinement is a function which examines the drift at the match filter output peaks relative to the original time reference produced by the Sync. A drift of less than ½ a chip is known to be erroneous, and therefore this is known to be produced by error sources present in the system. Time Refinement algorithms currently implemented in prior designs can often be reused to continuously refine the sample point for down-sampling. Curve fitting interpolation algorithms can be used to refine the sample point down to processing clock resolution. Transmit chips often should be up-sampled (zero-stuffed) and passed through digital FIR filters to shape each chip using a Nyquist pulse shape.

In the preferred embodiment of the invention, receive samples shall be passed through digital FIR filters using Nyquist pulse shape coefficients at the oversample rate, then down-sampled to produce samples at twice the chipping rate for further receive demodulation processing.

A transmit state machine can control packet generation including controlling data flow through FEC encoders and interleavers; generation of chip sequences for sync preamble, configuration information and time refinement segments, insertion of MTSK encoded streams and spreading. Similarly, a receive state machine can control packet decoding including reconfiguring MTSK decoder for sync preamble, configuration information and data decoding, enabling time refinement, and controlling data flow through de-interleavers and FEC decoders.

In one configuration of the preferred embodiment, the FPGA is a memory mapped peripheral of the DSP. The existing physical interfaces from the DSP to the FPGA and from the FPGA to the RF support LPI/LPD without modification. Often the FPGA address map currently used by prior waveforms has sufficient available unused locations to support the new LPI/LPD waveform. New DSP/FPGA interface controls can be added to support configuration of the LPI/LPD Core Modem functions; transmit data rate code, and receive detection thresholds. Often re-use of existing waveform capabilities is possible, for example, a Waveform Development Environment (WDE) platform as well as specific and common infrastructure such as; correlators, time refinement logic, and FEC CODECs; and baseband controllers, interleaving, chip shaping filters and AGC functions from waveforms such as SRW, WNW and LINK 16 prior designs can be reused. Changes made to reuse elements can be verified using vectors derived from systems simulations.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 16:
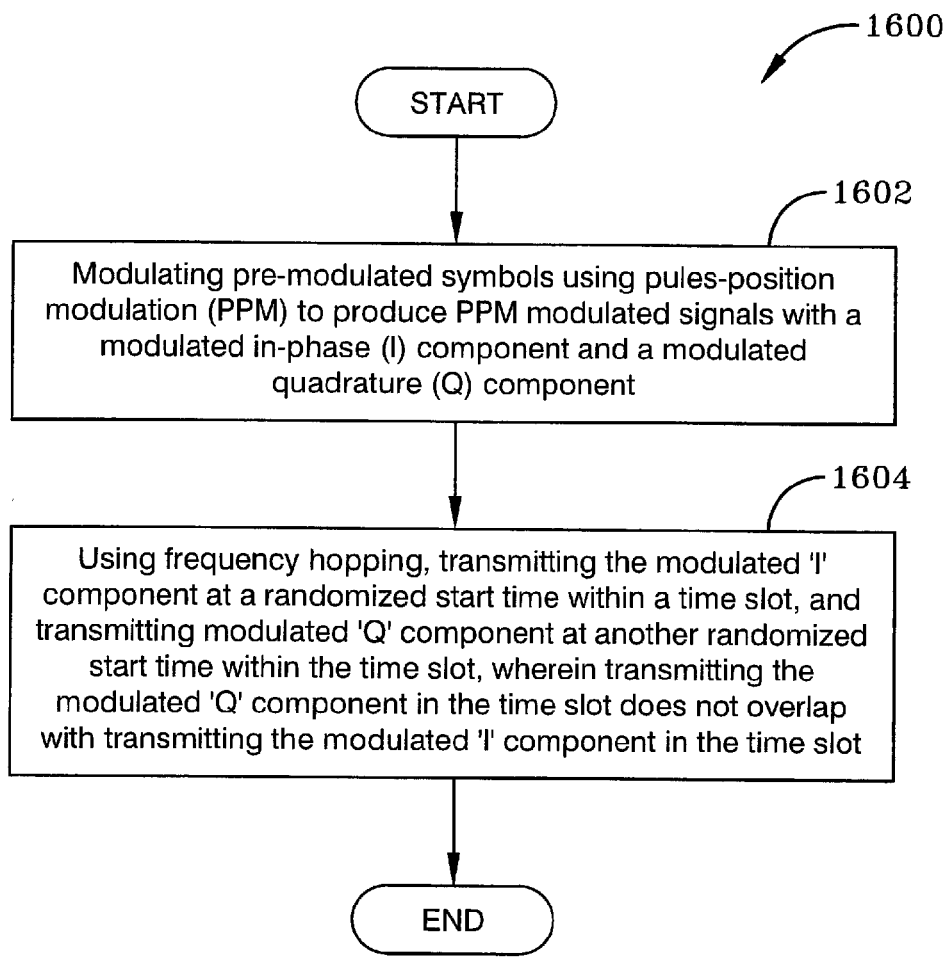
FIG. 16 illustrates an embodiment of a method for generating an LPI/LPD waveform.

FIG. 16 illustrates a method 1600 of generating a low probability detect (LPD) waveform. The method begins by modulating, at 1602, pre-modulated symbols using pulse-position modulation (PPM) to produce PPM modulated signals with a modulated in-phase (I) component and a modulated quadrature (Q) component. These components are each modulated so that they each have randomized start times within a fixed time slot. Frequency hopping is used, at 1604, to transmit the modulated I component at its randomized start time and to transmit the modulated Q component at its randomized start time within the time slot. The transmitted modulated Q component does not overlap with the transmitted modulated I component in the time slot. In some configurations, the method can overlay a transmission security (TRANSEC) pseudorandom (PN) overlay on the modulated Q component and the modulated I component before the modulated Q component and the modulated I component are transmitted.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method for generating a low probability of detection (LPD) waveform comprises:
   modulating pre-modulated symbols using pulse-position modulation (PPM) to produce PPM modulated signals with a modulated in-phase (I) component and a modulated quadrature (Q) component; and
   using frequency hopping, transmitting the modulated I component at a randomized start time within a time slot, and transmitting modulated Q component at another randomized start time within the time slot, wherein the transmitting the modulated Q component in the time slot does not overlap with the transmitting the modulated I component in the time slot.

2. The method for generating the LPD waveform of claim 1 further comprising:
   overlaying a transmission security (TRANSEC) pseudorandom (PN) overlay on the modulated Q component and the modulated I component before the modulated Q component and the modulated I component are transmitted.

3. The method for generating the LPD waveform of claim 1 further comprising:
   receiving data words; and
   Reed Solomon forward error correcting (FEC) the data words to produce the pre-modulated symbols.

4. The method for generating the LPD waveform of claim 1 further comprising:
   chip-shape filtering the pre-modulated symbols to produce modulated signals that are root raised cosine signals.

5. The method for generating the LPD waveform of claim 1 wherein the time slot is a first time slot, the modulated I component is a first modulated I component and the modulated Q component is a first modulated Q component and further comprising:
   transmitting in the first time slot the first modulated Q component before the first modulated I component is transmitted in the first time slot; and
   transmitting in a second time slot a second modulated I component before a second modulated Q component is transmitted in the second time slot.

6. The method for generating the LPD waveform of claim 1 wherein the modulating further comprises:
   modulating the modulated I component and the modulated Q component onto the time slot that is about 2.5 milliseconds long with about 2500 chips across that time slot, wherein the modulated I component has a duration of about 143 chips and the modulated Q component has a duration of about 143 chips.

7. The method for generating the LPD waveform of claim 1 wherein the time slot is third time slot and further comprising:
   forming a frame of data including at least a first time slot, a second time slot and the third slot; and
   modulating frame synchronizing information in at least one of the group of: the first time slot and the second slot.

8. The method for generating the LPD waveform of claim 7 wherein the modulating the frame synchronizing information further comprises:
   modulating a same random sequence more than two different times so that none of the more than two modulations of the same random sequence overlap.

9. The method for generating the LPD waveform of claim 7 where the modulating the frame synchronizing information further comprises:
   modulating a same random sequence seven different times so that none of the seven modulations of the same random sequence overlap.

10. The method for generating the LPD waveform of claim 9 wherein each random sequence has a duration of about 64 chips and the modulated I component has a duration of about 143 chips and the modulated Q component has a duration of about 143 chips so that the active duty cycles of the first time slot and the time second slot is similar to the time third slot.

11. The method for generating the LPD waveform of claim 1 further comprising:
    determining a bit error rate (BER) and a signal to noise ratio (SNR) of data received at a receive antenna; and
    adjusting a transmit power used to transmit the transmitting the modulated I component and the modulated Q component.

12. The method for generating the LPD waveform of claim 1 wherein the modulating pre-modulated symbols using PPM further comprises:
    modulating the modulated I components so that the modulated I component contains 11 bits and the modulated Q component contains 11 bits.

13. A system for generating a low probability of detection (LPD) waveform comprising:
    modulation logic to receive quasi-orthogonal code (QOC) symbols and to encode the QOC symbols using pulse-position modulating (PPM) the QOC symbols to generate a modulated in-phase (I) component and a modulated quadrature (Q) component, wherein the modulation logic is configured to modulate the I component onto a time slot with a fixed length, wherein the modulation logic is configured to modulate the I component onto the time slot with a random start time and the modulation logic is configured to modulate the Q component onto the time slot with a random start time so that pulses of the I component and the Q component do not overlap each other in the time slot; and
    a transmit logic configured to use frequency hopping, to transmit the I component and the Q component in the time slot.

14. The system for generating the LPD waveform of claim 13 further comprising:
    overlay logic configured to overlay a pseudorandom (PN) overlay on the Q component and the I component before the Q component and the I component are transmitted.

15. The system for generating the LPD waveform of claim 14 further comprising:
    forward error correction (FEC) logic configured to forward error correct and interleave raw symbols to produce the QOC symbols.

16. The system for generating the LPD waveform of claim 15 wherein the modulation logic, the overlay logic and the FEC logic are formed as part of a system on a chip and further comprising:
    state machine logic configured to control the modulation logic, the overlay logic and the FEC logic.

17. The system for generating the LPD waveform of claim 15 wherein the FEC logic is configured to forward error correct the raw symbols using a Reed Solomon algorithm.

18. The system for generating the LPD waveform of claim 13 further comprising:
    configuration logic configured to receive a preset value, and wherein the configuration logic is configured to configure the modulation logic to generate the I component to have a number of bits and a number of chips based, at least in part, on the preset value.

19. The system for generating the LPD waveform of claim 18 wherein when the preset value is a first value, the number of bits of the I component is a first bit value and the number of chips is a first chip value, wherein when the preset value is a second value, the number of bits of the I component is a second bit value and the number of chips is a second chip value, wherein the first bit value is a different number of bits than the second bit value, and wherein the first chip value is a different number of chips than the second chip value.

20. The system for generating the LPD waveform of claim 13 wherein the modulation logic further comprises:

chip-shape filtering logic configured to chip-shape filter the QOC symbols to produce the I component and the Q component that are root raised cosine signals.

* * * * *